United States Patent [19]
Lesellier et al.

[11] Patent Number: 6,066,354
[45] Date of Patent: May 23, 2000

[54] PREPARING FOODSTUFFS BASED ON FISH FLESH, AND FOODSTUFFS OBTAINED THEREBY

[75] Inventors: Philippe Lesellier, Tilly Sur Seulles; Jean-Luc Bigot, Bayeux, both of France

[73] Assignee: Neptune, S.A., Viroflay Cedex, France

[21] Appl. No.: 09/008,595

[22] Filed: Jan. 16, 1998

[30] Foreign Application Priority Data

Jan. 20, 1997 [FR] France .................................. 97 00548

[51] Int. Cl.⁷ ...................................................... A23L 1/325
[52] U.S. Cl. .......................... 426/643; 426/413; 426/414; 426/415; 426/513; 426/521; 426/403
[58] Field of Search ..................................... 426/643, 513, 426/414, 415, 413, 521, 403

[56] References Cited

U.S. PATENT DOCUMENTS

| | | | |
|---|---|---|---|
| 3,615,686 | 10/1971 | Marshall | 99/100 P |
| 3,863,017 | 1/1975 | Yueh | 426/376 |
| 4,399,161 | 8/1983 | Nakamura et al. | 426/541 |
| 4,474,823 | 10/1984 | Nishikawa et al. | 426/643 |
| 4,762,722 | 8/1988 | Izumimoto et al. | 426/124 |
| 4,968,520 | 11/1990 | Wang | 426/524 |
| 5,523,102 | 6/1996 | Morasch | 426/296 |

FOREIGN PATENT DOCUMENTS

| | | |
|---|---|---|
| 0 701 780 | 3/1996 | European Pat. Off. . |
| 2 729 830 | 2/1995 | France . |
| 63-279766 | 11/1988 | Japan . |
| 95/02337 | 1/1995 | WIPO . |

*Primary Examiner*—Chhaya D. Sayala
*Attorney, Agent, or Firm*—Morgan, Lewis & Bockius LLP

[57] ABSTRACT

The present invention relates mainly to a method of preparing foodstuffs based on fish flesh [i.e. the flesh of fish proper, and/or shellfish], and to foodstuffs obtained by this method. In the method of the invention, the fish flesh is mechanically mixed or kneaded to a moderate extent, i.e. the mechanical action avoids any significant irreversible spoiling of the fiber structure of the flesh, this action taking place in the presence of edible water-retaining compounds, in particular edible hydrocolloids. Mixing and/or kneading is continued until a uniform distribution is obtained in the mass of fish flesh of the water-retaining compounds and any other additives. The present invention is particularly applicable to the food industry. The present invention is mainly applicable to transforming fish proper, as distinct from shellfish.

17 Claims, 4 Drawing Sheets

PREPARING FOODSTUFFS BASED ON FISH FLESH, AND FOODSTUFFS OBTAINED THEREBY

The present invention relates mainly to a method of preparing foodstuffs based on fish flesh (i.e. the flesh of fish proper, and/or of shellfish), and to foodstuffs obtained in this way by said method.

BACKGROUND OF THE INVENTION

It is known that individual portions of fish can be vacuum-packed in sachets ready for cooking. The sachets are then raised to high temperature, thereby cooking and pasteurizing them. This serves firstly to coagulate the proteins and secondly to increase shelf life.

Unfortunately, traditional cooking partially destroys the foodstuff. Firstly aqueous liquid containing coagulated proteins is exuded. Secondly, cooking deteriorates the Theological properties of the foodstuff. This deterioration is particularly marked with fish, where the flesh becomes firmer and dries out.

This causes deterioration in the organoleptic properties of the cooked foodstuff. In addition, fish immersed in an exuded aqueous liquid is unattractive in appearance and that can cause customers to reject it, particularly when the fish is in the form of individual portions vacuum-packed in transparent sachets and sold in self-service stores.

U.S. Pat. No. 2,705,868 proposes a method of cooking fish flesh that has been partially dehydrated and vacuum-packed under a pressure of several bars.

Although that method generally gives satisfaction, it gives rise to a loss of mass due to water loss and thus to a reduction in the sale value of the foodstuff.

It is known to add additives such as sugar polyphosphates and/or hydrocolloids to fish flesh, in particular prior to freezing, in order to avoid water loss by dripping during thawing. In such applications, the additives perform a cryoprotection function. The same additives are used in formulations for fancy products based on the flesh or pulp of fish, in which case they act as a binder; they enable fish debris or crumbs to be given shape and/or to be recompacted.

It is known to mix (75% to 90%) fish lumps and to provide cohesion between the lumps by coating them with a paste made up of fish flesh together with possible additives such as salts and/or proteins.

Patent FR-A-2 729 830 describes a method of preparing frozen raw fish that includes agglomerating large lumps of fish flesh. That method sets out to perform treatment at a temperature lying in the range −10° C. to −2° C., so as to keep the water constituting the fish flesh in a crystallized state and therefore avoid said water being exuded and lost. Nevertheless, when the foodstuff described in FR-A-2 729 830 is subsequently cooked, that will normally lead to water and protein being exuded and lost.

Hydrocolloids, and in particular carrageenins are conventionally used to reinforce the protein lattice, thus making it possible to obtain products that can be sliced. Nevertheless, the applications concerned are products in which the fish flesh is ground up (e.g. fish paste) and does not conserve its structure (Jensen, Food Marketing & Technology, August 1993, pp. 6–8).

It is known to treat fish with a solution of polyphosphate (soaking or steaming); polyphosphates appear to modify the surface state of proteins, thereby making it possible to avoid water loss from inside muscle, particularly when deep freezing fish (Gordon, Food Manufacture, July 1971, pp. 57–58).

The Applicant has found a particular way of incorporating water-retaining agents making it possible to conserve the fiber structure of fish flesh, and to limit to a considerable extent the amount of liquid that is exuded during cooking.

Without taking appropriate precautions, any attempt at causing water-retaining compounds to penetrate into the mass of the flesh, in particular by mixing under strong mechanical action, ends up with irreversible spoiling of the fiber structure due to physical breakage. Such spoiling consists in the lumps of flesh being broken up excessively to small dimensions that do not give the desired organoleptic qualities to the foodstuff and/or to spoiling of the fibers making up each lump.

OBJECTS AND SUMMARY OF THE INVENTION

Consequently, an object of the present invention is to provide a foodstuff based on fish flesh that has good organoleptic qualities.

Another object of the present invention is to provide such a foodstuff that is pleasing in appearance.

Another object of the present invention is to provide a foodstuff having a long shelf life when deep frozen or when refrigerated.

Another object of the present invention is to provide a low cost industrial method of preparing a foodstuff based on fish flesh.

Another object of the present invention is to provide a method of preparing a foodstuff based on fish flesh in which water loss is low, or zero, or even in which it is possible to hydrate the flesh.

Another object of the present invention is to provide such a method of preparing a solid foodstuff comprising large-sized lumps of fish flesh. The size of a lump depends on the initial size of the available pieces of fish flesh. For example, lump size may be about one centimeter for shrimp and a few centimeters to as much as ten centimeters or even several tens of centimeters for fish fillets.

According to the invention, these objects are achieved by a method of mechanically mixing and/or kneading fish flesh to a moderate extent, i.e. mixing or kneading that avoids significant irreversible spoiling of the fiber structure of the flesh, and doing so in the presence of edible water-retaining compounds, and in particular edible hydrocolloids. The mixing and/or kneading is continued until the water-retaining compounds and any other additives have been distributed homogeneously throughout the mass of flesh.

Diffusion of the water-retaining compound(s), of cohesion agents, and of other additives throughout the mass of fish flesh to be treated is slowed down by the large size of the lumps of flesh, by the compact structure of the flesh which the method of the invention sets out to preserve, by the absence of any rough mechanical stirring, and by processing taking place at a low temperature which favors conservation of the treated flesh by limiting multiplication of bacteria. To achieve acceptable diffusion times, mechanical means are implemented for stirring, mixing, and/or kneading that operate globally or locally but without imparting any stresses to the flesh that is to be processed that might damage the structure thereof.

Uniformly distributing water-retaining compounds throughout the mass of flesh improves the organoleptic qualities of the resulting foodstuff because of reduced water loss. In this way, less than 2% loss is obtained for a product processed by the invention, whereas more than 15% is obtained for a product that has not been processed thereby.

Advantageously, the step of mixing or kneading the flesh comprises a step of churning.

Advantageously, the churning is followed by forming and/or measuring out and cooking in vacuum packaging. Advantageously, the packaging reproduces the natural shape of fish pieces, in particular the shape of a steak or a fillet.

The invention mainly provides a method of preparing a foodstuff based on fish flesh, the method including a step of putting the fish flesh into a mixer device together with a water-retaining compound, in particular a hydrocolloid, and in mixing to enable the water-retaining compound to penetrate into the core of lumps of fish flesh without destroying the structure of said flesh.

The invention also provides a method wherein the fish flesh includes lumps having dimensions greater than 1 cm.

The invention also provides a method wherein the mixer device is a churner.

The invention also provides a method wherein churning is performed for a duration lying in the range quarter of an hour to five hours, and preferably in the range one hour to three hours.

The invention also provides a method wherein mixing is performed at a temperature lying in the range –5° C. to +2° C.

The invention also provides a method including a cooling step.

The invention also provides a method wherein the cooling is performed by inserting nitrogen into the mixer device from a source of liquid nitrogen.

The invention also provides a method of manufacturing a foodstuff, including a mixing step, followed by measuring out and/or forming a mass of the resulting textured fish flesh.

The invention also provides a method wherein forming is performed at a pressure of less than 700,000 Pa.

The invention also provides a method wherein, during forming and/or measuring out, a mass of textured fish flesh is inserted into a container having the shape of a piece of fish or a piece of shellfish that is to be reproduced, in particular a fillet or a steak.

The invention also provides a method wherein the container is a food grade small tray of plastics material and wherein the method includes a step of putting a hermetically sealed capsule into place thereon under a vacuum.

The invention also provides a method further including a step of cooking in an autoclave.

The invention also provides a method including a step of deep freezing the foodstuff.

The invention also provides a foodstuff obtained by the method of the invention.

BRIEF DESCRIPTION OF THE DRAWINGS

The invention will be better understood from the following description and the accompanying figures given as non-limiting examples, and in which.

MORE DETAILED DESCRIPTION

Figure 1:
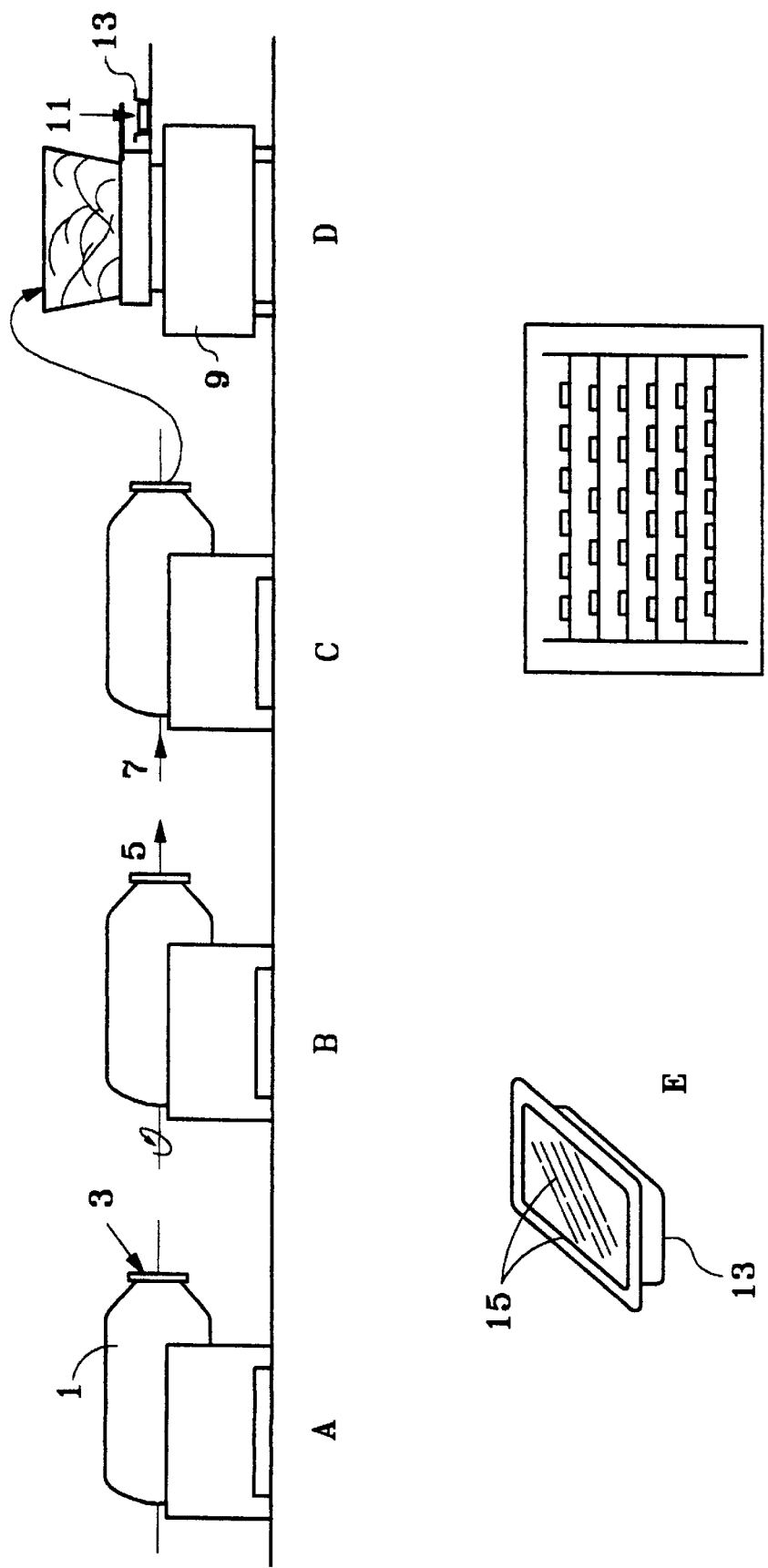
FIG. 1 is an explanatory diagram of the method of the present invention.

FIG. 1 shows the preferred implementation of the method of the present invention.

At A, the ingredients are inserted into a device for accelerating penetration of water-retaining compounds, advantageously in a horizontal-axis churner 1. In a variant, use is made of mixers, stirrers, homogenizers, or any other device that performs mechanical mixing without imparting stresses that are liable to damage the fiber structure of the flesh. It is also possible to use devices, in particular piezo-electrical devices, that generate sound, ultrasound, or infra-sound vibrations in the mixture to be processed, including at least the fish flesh and a water-retaining compound, in particular a hydrocolloid. It is also possible to include stabilizers, coloring agents, flavoring, water, oils, etc. Advantageously, the fish flesh is inserted at a temperature lying in the range –10° C. to +10° C., preferably in the range –5° C. to +2° C., e.g. equal to –1° C., –0.5° C., or 0° C. At temperatures below –5° C., fish flesh tends to harden, which ought to be avoided. Nevertheless, it is also possible to insert deep frozen fish into the churner, with the temperature of the fish flesh increasing as a result of heating and/or as a result of the mixing performed. In contrast, above 10° C., fish flesh runs the risk of being subjected to bacteriological deterioration and to water loss.

The door 3 of the churner is closed hermetically.

Advantageously, the churner 1 includes means for adjusting its speed of rotation that enable a speed of rotation to be selected that is very low, and less than one revolution per minute (rpm), e.g. equal to 0.2 rpm or advantageously 0.1 rpm, or even less.

At B, as symbolized by arrow 5, the internal pressure inside the churner is reduced.

Surprisingly, in order to obtain a firm foodstuff based on fish flesh, i.e. a foodstuff in which the myotomes of the fish flesh are closed, it is advantageous to establish a partial vacuum inside the churner, thereby temporarily opening the myotomes and thus favoring penetration of additives into the fish flesh, and in particular penetration of hydrocolloids. Nevertheless, the pressure in the churner is preferably sufficient to ensure that the opening of the myotomes is reversible on returning to atmospheric pressure. Results have been improved using a pressure inside the churner lying in the range $0.45 \times 10^5$ Pa to $0.65 \times 10^5$ Pa.

It is also possible to add surimi, fish protein, cheese, herbs, onions, vegetables, garnishing, or sugar.

The churning, i.e. rotation of the churner, lasts for a time in the range ¼ of an hour (h) to 5 h, advantageously in the range 1 h to 3 h, for example 2 h, depending on the extent to which the vessel is filled.

The speed of rotation should be smaller with increasing diameter of the churner. The churner may be rotated continuously in a single direction or it may be rotated in a succession of cycles in a single direction or with its direction of rotation being reversed. The churning causes the additives to penetrate into the fish flesh, thereby enabling the foodstuff to be homogenized.

As a function both of ambient temperature and of the energy imparted to the mass during churning, in particular by rotation of the churner 1, it may be advantageous to cool the contents of the churner. In the example shown at C, arrow 7 represents inserting nitrogen which is taken from a source of liquid nitrogen.

At D, the mass obtained by churning is formed.

Advantageously, forming is performed at low pressure, e.g. equal to 345,000 Pa, so as to avoid tearing the fish flesh since that would destroy the fiber structure of the foodstuff. By way of example, the former 9 includes a piston 11 which forces the foodstuff into packaging 13.

Advantageously, the packaging 13 has the same shape as a piece of fish, for example a fillet or a steak, or it has the shape of a shellfish. Advantageously, the bottom of the packaging 13 has irregularities analogous to those present on the part of a fish that is being reproduced. These irregularities impart their shape to the foodstuff of the present invention. By way of example, the packaging 13 may be constituted by small trays of polypropylene or of poly (ethylene vinyl alcohol) (EVOH). Thus, during forming, the textured mass of fish flesh is agglomerated so as to give it the shape of a piece of fish, in particular a fillet or a steak.

Advantageously, forming is performed at constant weight, with the precise shape being conferred by the shape of the packaging 13. In a variant, during forming, not only is the mass of textured fish flesh deposited in the container, but garnishing is also deposited therein. The garnishing can be deposited on the bottom of the small tray, on the top, or on at least one of the sides.

At E, the packaging 13 receives a hermetically sealed capsule 15.

At F, the foodstuff is cooked.

Cooking may be performed, for example, in an autoclave, using steam cooking, etc. Because the foodstuff is vacuum-packed, it is not diluted during the cooking step. By way of example, cooking can be performed for a length of time lying in the range ½ h to 4 h, and preferably in the 1 h to 3 h, at a temperature lying in the range 50° C. to 100° C., preferably in the range 70° C. to 90° C., e.g. equal to 75° C., and at a pressure lying in the range 0 to $4 \times 10^5$ Pa, and preferably in the range $10^5$ Pa to $3 \times 10^5$ Pa, e.g. $2 \times 10^5$ Pa. In a variant, the cooking step is replaced by texturing at high pressure, e.g in the range $2 \times 10^8$ Pa to $4 \times 10^8$ Pa, and/or by decontamination using ionizing radiation.

The packaged foodstuff commonly has a shelf life of 45 days to 60 days at refrigeration temperatures (temperature less than 5° C.).

In a variant, after step D, E, or F, the foodstuff of the present invention can be deep frozen for conservation and/or commercialization purposes.

Figure 2:
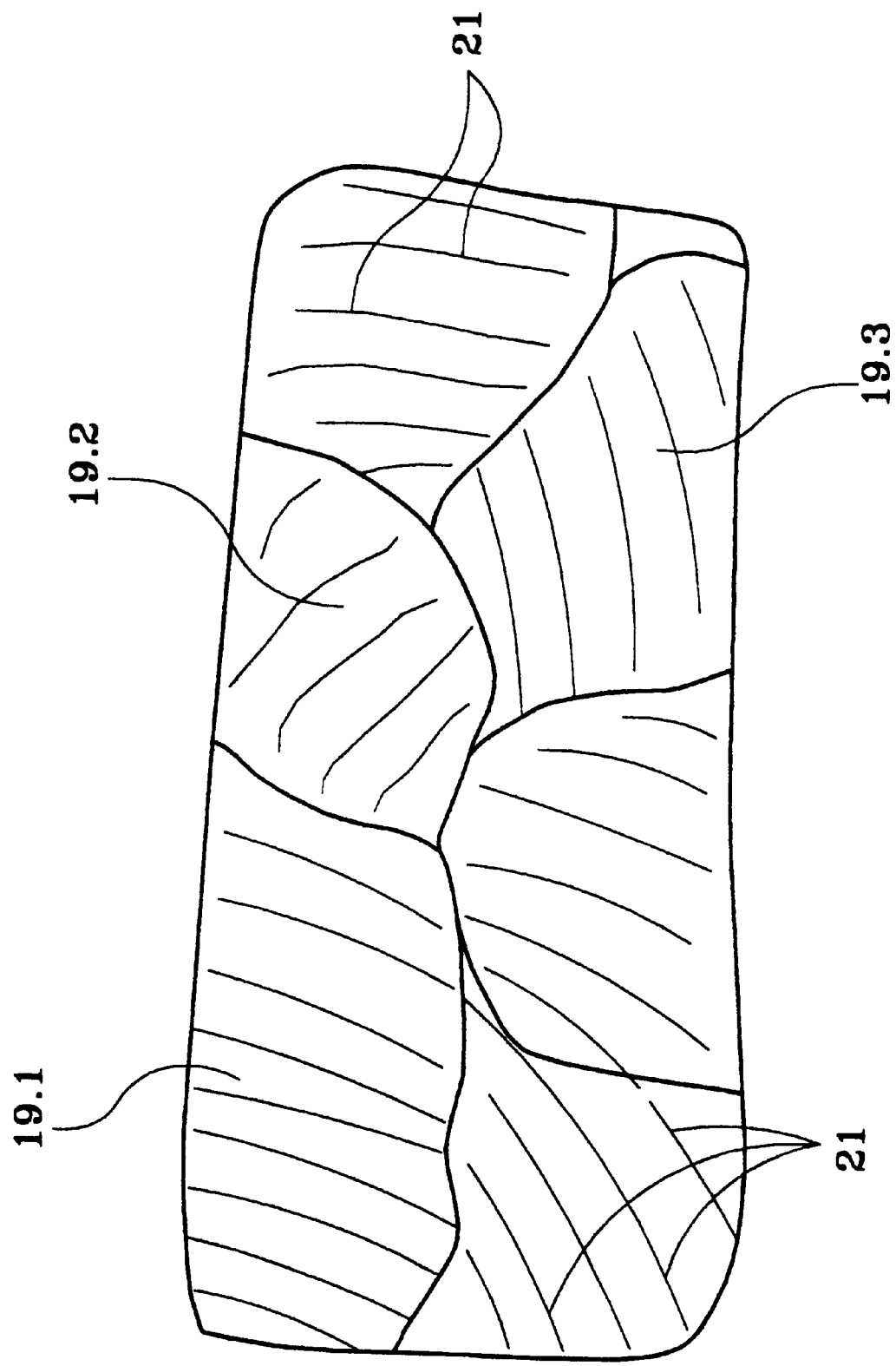
FIG. 2 is a diagrammatic view showing the structure of the foodstuff of the present invention.

FIG. 2 shows an example of a fish fillet reconstituted by the present invention. The fillet 19 comprises juxtaposed lumps 19.1, 19.2, and 19.3 of fish without any disorganization of its myotomes 21. The dimensions of the lumps 19 lie in the range 1 cm to 6 cm, preferably in the range 2 cm to 4 cm, e.g. being equal to 2 cm or 3 cm. At least 80% of the reconstituted fillet is made up of lumps of this size.

There follow several non-limiting examples of formulations that can be implemented by the method of the present invention. Percentages are percentages by weight.

EXAMPLE 1

A fillet of fresh whiting plus (0.5%) polyphosphates and 0.2% carrageenins were placed in a double-walled mixer. Mixing was performed at low speed. The temperature of the mixture was maintained below 5° C. by a flow of ice water through the double wall. 100 grams (g) of mixture were then thrust into a fillet-shaped mold which was then vacuum-closed and placed in an autoclave, with its temperature rising to 80° C. over 5 minutes and being maintained at 80° C. for 1 hour. After cooling, the amount of liquid exuded was measured and compared with the amount of liquid exuded from a mixture that had been subjected to the same process but without any water-retaining agents:

| Process | Liquid exuded on the same day (in %) | Liquid exuded after storage for 10 days at 4° C. (in %) |
|---|---|---|
| without additives | 10.5 | 14 |
| with additives (polyphosphates + carrageenins) | 0.34 | 2.5 |

EXAMPLE 2

A series of experiments was performed on frozen salmon together with 0.3% polyphosphates. The mixer used was a Stephan type mixer without thermostatic control, including equipment for making a vacuum and modified to operate at very low speed. The energy provided was necessary and sufficient for unfreezing the fillet of salmon during the operation, and the total duration of the process was sufficiently short to ensure that the fish did not heat up to more than 4° C.

The first test consisted in performing the mixing operation at atmospheric pressure. In the second test, a partial vacuum ($8 \times 10^4$ Pa) was implemented throughout the mixing operation. After mixing, the resulting mixture was molded in the form of a salmon steak, the container was then sealed and subjected to heat treatment in a team tunnel: for 10 minutes in a module at 80° C. or for 5 minutes in a module at 75° C. After cooling, the mounts exuded were evaluated as in Example 1:

| Process | Liquid exuded on the same day (in %) | Liquid exuded after storage for 10 days at 4° C. (in %) |
|---|---|---|
| atmospheric pressure | 1.70 | 5 |
| partial vacuum | 1.25 | 3 |

Mixing under a vacuum provides a moderate improvement in the water-retention qualities of the mixture treated in this way.

EXAMPLE 3

Fillets of fresh cod were inserted into a churner together with a mixture of polyphosphates, carob-bean, and salt.

Mixing took place at a low speed of rotation for 5 minutes.

Crushed ice and water were added to keep the temperature of the mixture at around 0° C.

100 g portions were measured out into a composite card/polyester package (capable of withstanding high temperature) that was vacuum-sealed and subjected to cooking-pasteurization processing in a microwave tunnel so as to achieve a core temperature of 80° C. The resulting product had a shelf life of 60 days when refrigerated (temperature less than +5° C.) and there was no modification to the organoleptic properties and there was no significant fluid loss from the fillet.

EXAMPLE 4

White crab flesh (body+legs) was mixed with a salt solution of polyphosphates, carrageenins, and flavoring for reinforcing crab taste, in a paddle mixer (at 5 rpm) for 1 h 30 min.

The mixture was measured out under a vacuum into a glass container having the shape of a crab's claw, the cover was put into place and then the mixture was cooked in an autoclave at a pressure of $5 \times 10^5$ Pa for 1 h 30 min at low temperature (72° C.) to reduce fluid loss and to conserve the properties of the crab fibers.

Figure 3:
FIG. 3 comprises three images obtained using an scanning electron microscope showing the structure of fish flesh after being subjected solely to vacuum cooking.

FIG. 3 shows fibers of fish flesh that are rectangular in section and that have been subjected to vacuum cooking of conventional type. They are flat and do not appear to be "full", i.e. they do not appear to be swollen full of water.

Figure 4:
FIG. 4 comprises three images obtained with an electron microscope showing fish flesh after it has been subjected to the process of the present invention.

In FIG. 4, there can be seen similar fibers of fish flesh that have been subjected to processing of the invention followed by cooking under a vacuum, that are likewise rectangular in section, but that are much less geometrical in shape, being more rounded and looking fuller.

The images in FIGS. 3 and 4 were obtained without destroying the preparation using electrons at an energy of 20 keV ($3.204 \times 10^{15}$ J) and a magnification of 300 times.

The black and white segment in the images corresponds to 50 µm.

The present invention applies particularly to the food industry.

The present invention applies mainly to processing fish proper, as distinct from shellfish.

We claim:

1. A method of preparing a foodstuff based on fish flesh, comprising the steps of: putting the fish flesh into a mixer device together with a water-retaining compound, and mixing under conditions that enable the water-retaining compound to penetrate into the core of the fish flesh without destroying the structure of the fish flesh, which mixing conditions include mixing at a temperature within the range of −10° C. to +10° C. and at a speed of rotation equal to 0.2 rpm or less.

2. A method according to claim 1, wherein the fish flesh includes lumps having dimensions greater than 1 cm.

3. A method according to claim 1, wherein the mixer device is a churner.

4. A method according to claim 1, wherein mixing is performed for a duration of fifteen minutes to five hours.

5. A method according to claim 4, wherein mixing is performed for a duration of one hour to three hours.

6. A method according to claim 1, wherein mixing is performed within a temperature range of −5° C. to +2° C.

7. A method according to claim 1, including a cooling step.

8. A method according to claim 7, wherein the cooling step is accomplished via the use of liquid nitrogen to cool the contents of the mixer device.

9. A method according to claim 1, further comprising at least one of: the step of measuring out the fish flesh after the mixing step or the step of forming a mass of the fish flesh after the mixing step.

10. A method according to claim 9, wherein the forming step is performed at a pressure of less than 700,000 Pa.

11. A method according to clam 9, wherein the fish flesh that is measured or formed is inserted into a container having the shape of a piece of fish or a piece of shellfish.

12. A method according to claim 11, wherein said container having the shape of a piece of fish or a piece of shellfish is selected from: a container having the shape of a fillet, or a container having the shape of a steak.

13. A method according to claim 9, wherein the forming step further comprises inserting the mass of fish flesh into a food grade container, followed by hermetically sealing the container.

14. A method according to claim 1, further comprising the steps of: vacuum-packaging the fish flesh after the mixing step and cooking in an autoclave.

15. A method according to claim 1, wherein said water-retaining compound is a hydrocolloid.

16. A method according to claim 1, including a step of deep freezing the foodstuff.

17. A foodstuff obtained by the method according to claim 1.

* * * * *